March 21, 1939.  M. J. RYMLAND  2,151,155
SPRING CUSHION UNIT
Filed July 3, 1936  2 Sheets-Sheet 1

Inventor
MURRAY J. RYMLAND,
By Henry Love Clarke
his Attorney

March 21, 1939.  M. J. RYMLAND  2,151,155
SPRING CUSHION UNIT
Filed July 3, 1936   2 Sheets-Sheet 2

Inventor
MURRAY J. RYMLAND,
By Henry Love Clarke
his Attorney

Patented Mar. 21, 1939

2,151,155

UNITED STATES PATENT OFFICE 2,151,155

SPRING CUSHION UNIT

Murray J. Rymland, Baltimore, Md.

Application July 3, 1936, Serial No. 88,705

1 Claim. (Cl. 5—259)

This invention relates in general to improvements in spring cushion units and more particularly to improvements for effectively securing coiled springs in a simple manner in spring cushion units for cushions, upholstery, bedding and the like.

Objects of the invention are the provision of an assembly of coiled steel wire springs in which the end coils are joined with each other or with other wire frame parts permitting yielding of the springs without producing squeaks or objectionable noise by movements between the parts which secure the springs in position; the connection of the springs as aforesaid in a manner that avoids buckling or distortion in the assembled unit by reason of the connection, but rather provides a substantially flat horizontal surface which when compressed at any localized region will distribute the weight to surrounding spring areas; the connection of the springs as aforesaid by means of a simple form of flat clip in such manner that the clips will not turn around or slip along the wires they connect, will not loosen or rip open in service, and this without resort to indentations or abrasions in the clips or wires which indentations or abrasions normally tend to weaken the wires in service and eventually result in breaks causing sharp edges or wires to penetrate the fabrics usually employed to cover the assembled spring construction; the provision of a clip connection essentially employing the normal spring tension in the coils but under compression by the clips so as to frictionally hold the wires by such compression in place tightly against each other in a single plane and thereby retain the clip from turning around on the clipped wires or slipping lengthwise thereof; and the invention has for further objects such other improvements or advantages in construction and operation as may be found to obtain in the structures and devices hereinafter described or claimed.

In the accompanying drawings forming a part of this specification and showing, for purposes of exemplification, a preferred form and manner in which the invention may be embodied and practiced, but without limiting the claimed invention specifically to such illustrative instance or instances:

Figure 1:
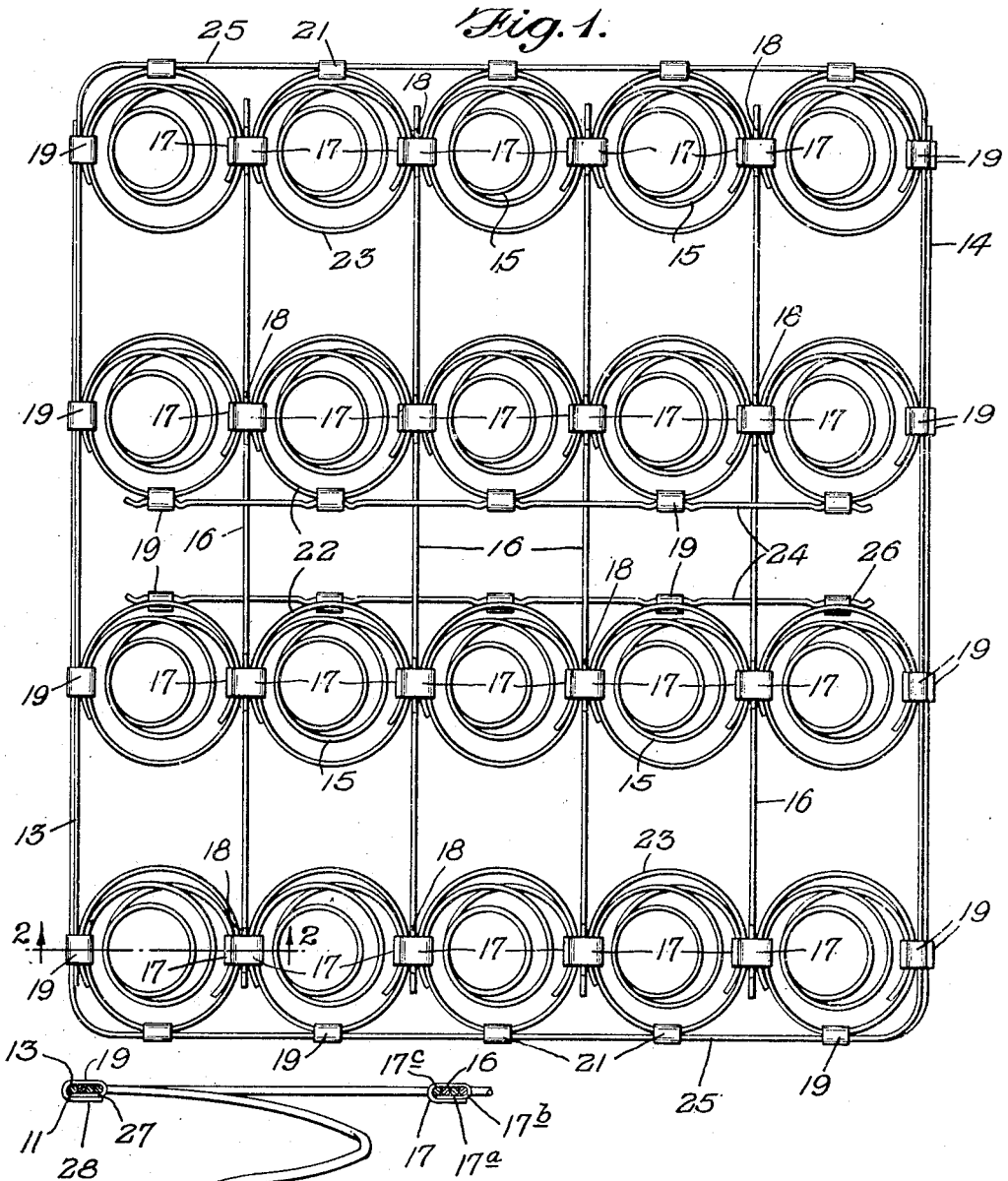
Figure 1 is a top plan view of a spring cushion unit constructed in accordance with the present invention.
Figure 2:
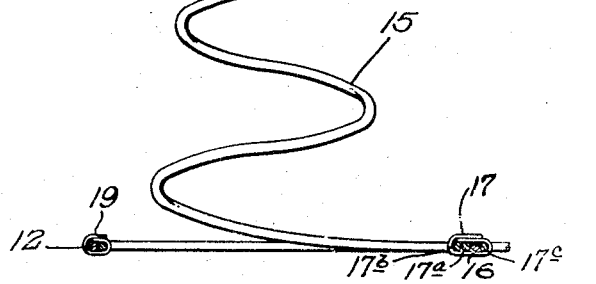
Fig. 2 is a sectional view taken on the line 2—2 of Fig. 1.

In its present embodiment, the invention is incorporated in a spring cushion unit that constitutes the spring insert or filler for a removable cushion for davenports, lounge chairs, or the like. For convenience the present description will be confined to this use of the invention; features of the invention are, however, capable of other valuable applications, for example, mattresses; consequently the scope of the invention is not confined to the specific use and specific embodiment herein described as an illustrative example.

Referring to the drawings, there is shown a frame comprising a single continuous upper marginal wire 11 and a single continuous lower marginal wire 12. The terminals of the upper wire 11 are lapped at one marginal edge of the unit as shown at 13, and the terminals of the lower wire are similarly lapped but at the opposite marginal edge of the cushion, as indicated at 14, to provide a reversible cushion having similar reinforcement at one of the front edges of both the upper and lower seating faces of the cushion. Between the upper and lower wires, a plurality of rows of coiled springs 15 are arranged. Preferably, the rows are held in spaced relation by spacer wires 16, and the springs in each row are disposed closely adjacent each other and connected together by flat clips 17, as hereinafter described, at both the upper and lower ends of the coiled springs.

Figure 3:
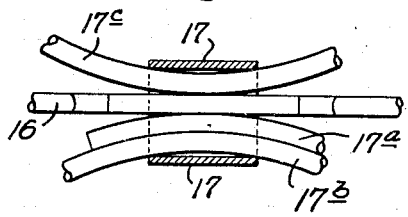
Fig. 3 is an exaggerated top plan view with parts of the clip broken away for clearness of illustration illustrating the clip and wires in position for clamping.
Figure 4:
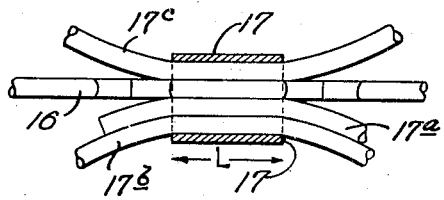
Fig. 4 is a view similar to Fig. 3 but illustrating the clip and wires in final clamped position.
Figure 5:
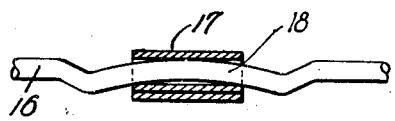
Fig. 5 is a sectional view illustrating the clip and tie-wire in position for clamping.
Figure 6:
Fig. 6 is a view similar to Fig. 5 but illustrating the clip and the wire in final clamped position.

In accordance with the present invention, each of the inner coils of a row is connected to the adjacent coil, and the coils next to the marginal portions of the cushion unit are also connected to the upper and lower marginal wires 11 and 12 by flat clips of such length relative to the diameter of the upper and lower coils of the springs 15 and of such rigidity and tensile strength as to cause the wires clipped thereby and the clips themselves to be held against turning or slipping by compression of the arc, or part of the convolutions of the coils in the clips with frictional contact of other wires therein and with the clip, due to the clinching or compression of the clip thereon. In this manner the normal tendency of the compressed portions of the convolutions of the springs to assume their normal coiled shape frictionally holds the parts in situ. The clips must, for the purpose, be of such length relative to the diameter of the coil, of at least one of the springs, to be embraced as to form a chord of an arc of such substantial curvature as to cause compression of that arc of the wire in the direction of the plane of the coil, from the position indicated in Fig. 3 to the position indicated in Fig. 4, which resists slipping of the clip lengthwise of the wires and so frictionally holds the wires against each other by compression as to keep them in place in the clip, thereby preventing relative movement.

This principle of clipping is suitable for holding two or more wires in contact with each other. As shown in Fig. 1, the adjacent portions of the inner coils are secured to each other by clips 17 embracing the free end of the outermost coil 17a and the next lower coil 17b of one spring and the outermost coil 17c (at top or bottom) of the next adjacent spring with the spacer wire 16 between the wires of the respective springs. Preferably the portions of the spacer wires that are to be contained within the clips are also curved as at 18 but in a direction transversely to the plane of the coils so as to provide an arc compressible in a direction perpendicular to the direction of the curvature of the coils. The end coils of the springs next to the marginal wires 11 and 12 are connected thereto by narrower clips 19 embracing the single strand of the marginal wire (11 or 12) and the end coil of the springs, all as indicated at 21. When the marginal wires (11 or 12) are lapped as at 13 the clips embrace both strands of the marginal wires, the free end of the outermost coil and the next coil of the springs. The springs in each of the inner rows of springs 22 (between the outer rows 23) are also connected by a tie-wire 24 paralleling the marginal edges 25, by similar narrow clips 19 for embracing two wires 24, but in these instances the tie-wires 24 are preferably curved in the plane of the coil connected therewith as indicated at 26.

Figure 9:
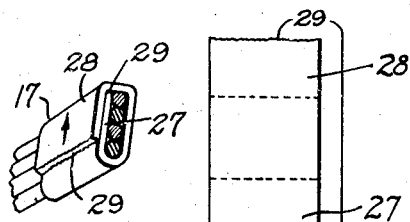
Figs. 9 and 10 are perspective views illustrating clips with wires therein made from blanks of Figs. 7 and 8 respectively.
Figure 10:
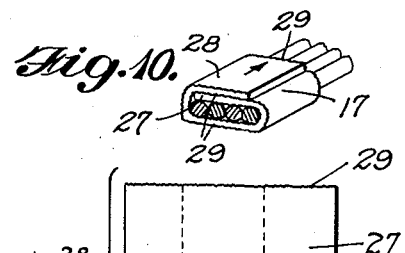
Figure 7:
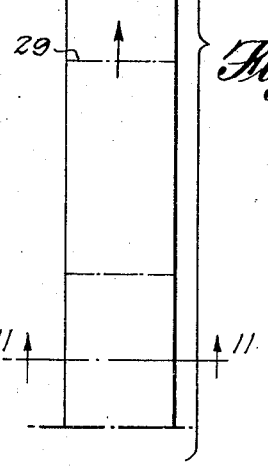
Figs. 7 and 8 are plan views of metal blanks from which the clips may be made.
Figure 8:
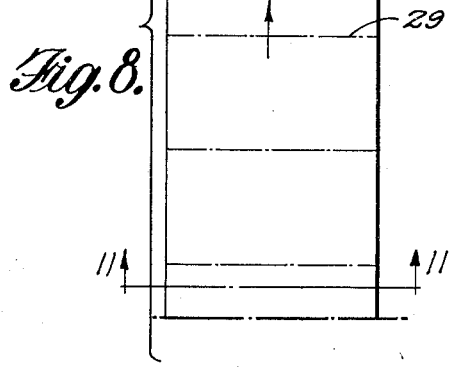
Figure 12:
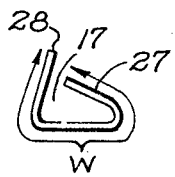
Fig. 12 is an end view of a preferred form of the clip before insertion of wires and clinching the clip thereon.
Figure 11:
Fig. 11 is a sectional view taken on the line 11—11 of Figs. 7 and 8.

Preferably, as shown in Fig. 12, the clips are of a predetermined width, W, determinable by the number and diameters of wires intended to be clipped by the respective clips. As shown in Figs. 9 and 10, each clip is provided with an inner fold 27 and an outer fold 28, the folding of which causes the aforesaid compressions of the arcs. The inner fold 27 is of sufficient width to contact the surface of all wires to be embraced within the clip, and the outer fold is likewise of such width as to lap the inner fold a distance equal to at least two wires. With such construction it is practically impossible for the clips to rip open in use of the cushion even by constant bending of the wires in opposite directions at the ends of the clips. As shown in Figs. 9 and 10, the various clipped wires preferably are held in a single plane within the clips, for maximum efficiency in service. While it has been found that the clips are serviceable with the grain of the metal (indicated by straight arrows) running lengthwise of the strands of wires as indicated in Figs. 8 and 10, I have found the efficiency and superiority of the aforesaid clipping construction is vastly improved by having the clips formed so that the grain of the metal runs transversely to the length of the strands of wires as indicated in Figs. 7 and 9. Such latter construction has the further advantage that the burrs, left in cutting the clips from blanks, are at the ends of the folds as indicated at 29 and do not project into the path of the wires as they would with a construction illustrated in Figs. 8 and 10. In the latter embodiment, the assembly of the wires in the clips is not as facile because the burrs 29 tend to prevent some of the wires from being clinched in a single plane by the clips, thus causing some humping of the wires in some of the clips. The construction illustrated in Figs. 7 and 9 avoids all this, affording greater ease and uniformity in manufacture and assembly. The construction illustrated in Figs. 7 and 9 has the further advantage that the finished clip provides for retaining unblemished the finished side edges 31 of the strips shown in Figs. 7 and 8. As shown in Fig. 11, such side edges are preferably what are termed in the trade as a No. 4 edge, neither round nor square, but slightly curved at the extremities of the edge as indicated at 32 and square or straight between the extremities as shown at 30 31. Such form of edge has been found to have greater merit in a clip formed as indicated in Figs. 7 and 9 since the curved extremities 32 avoid any minute cutting of the wires when they are flexed in service against the end edges 31 of the clips.

The length, L, width and depth of the clips will vary with the diameter of the coils and thickness and number of strands for which the clips are to be employed. While the explicit dimensions for exact sizes are not definitely statable, the practical dimensions required in any instance are readily determinable empirically in conformity with the foregoing description of purposes, operation and function.

Merely as a convenient guide in empirically embodying the principles of the present invention, the following description is given of clips and constructions I have found to be of advantage in incorporating the invention:

For clipping four wires, steel clips of .032 gauge and No. 3 temper, ⅝" long and 15/16" wide, are used with a channel about 7/16" wide and about 7/16" deep, with a little margin for clearance. Such clips will suffice for coil diameters ranging from 3" to 4". For coil diameters of less than 3", clips of about ½" in length are used and for coil diameters larger than 4", clips ⅝" in length are used. For clipping two wires together, steel clips of .026 gauge and No. 3 temper are used. The length of the clips for two wires is the same as with four wires but the width is less, ¾". Spring steel wire of 16 (.0625), 15½ (.0673) and 15 (.0720) gauge, is used for the coil springs. The above described four wire clips will take three 15½ g. and one 15 g. wires, or three 15 g. and one 15½ g., or four 15½ g., or three 16 g. and one 15 g.

In operation the wires are placed in side-by-side relation in the channel of the pre-formed clips shown in Fig. 12 with the wires all in the same plane as shown in Figs. 3 to 6. The folds 27 and 28 are then folded down to the position shown in Figs. 9 or 10. The folding of the folds clinches the wires together and at the same time shortens the available spaces in the channel in the clip thus causing the wires to frictionally engage each other and the clip and compress the arcs of the coils within the clips. The normal tendency of the compressed arcs to resume their normal shape maintains the wires tightly in frictional engagement with each other and with the inside of the clips thus preventing relative movement of the parts under service conditions.

The invention as hereinabove set forth is embodied in particular forms of construction but may be variously embodied within the scope of the claim hereinafter made.

I claim:

A spring cushion structure comprising adjoining wires connected together and clamped against movement by a metal connecting clip therefor, at least one of said wires comprising a coil of a coil spring, said clamped clip being long enough to compress a sufficient length of the coil so as to prevent slipping and turning solely by the clamping of the wires against each other by said clip.

MURRAY J. RYMLAND.